(12) United States Patent
Connors, Jr. et al.

(10) Patent No.: US 7,562,694 B2
(45) Date of Patent: Jul. 21, 2009

(54) REFRACTORY CASTING METHOD

(75) Inventors: Charles W. Connors, Jr., Barrington, IL (US); Shirish Shah, Carol Stream, IL (US)

(73) Assignee: Magneco/Metrel, Inc., Chicago, IL (US)

( * ) Notice: Subject to any disclaimer, the term of this patent is extended or adjusted under 35 U.S.C. 154(b) by 0 days.

(21) Appl. No.: 10/956,477

(22) Filed: Oct. 1, 2004

(65) Prior Publication Data

US 2006/0070715 A1 Apr. 6, 2006

(51) Int. Cl.
 *B22C 1/00* (2006.01)
 *B22C 7/00* (2006.01)
(52) U.S. Cl. ......................................... 164/529; 164/45
(58) Field of Classification Search .................. 164/529, 164/45, 235, 369, 361
 See application file for complete search history.

(56) References Cited

U.S. PATENT DOCUMENTS

| | | | |
|---|---|---|---|
| 3,631,745 A | 1/1972 | Walkey et al. | |
| 3,769,052 A * | 10/1973 | Kurtz | 524/5 |
| 4,127,629 A | 11/1978 | Weaver et al. | |
| 4,604,141 A * | 8/1986 | Natori et al. | 106/38.35 |
| 4,812,278 A | 3/1989 | Natori et al. | |
| 4,834,929 A | 5/1989 | Dehoff et al. | |
| 5,147,830 A * | 9/1992 | Banerjee et al. | 501/89 |
| 5,147,834 A | 9/1992 | Banerjee | |
| 5,169,578 A | 12/1992 | Fukao | |
| 5,260,011 A | 11/1993 | Wolter et al. | |
| 5,266,252 A | 11/1993 | Buck et al. | |
| 5,298,213 A | 3/1994 | Shyu | |
| 5,360,773 A * | 11/1994 | Winkelbauer et al. | 501/133 |
| 5,422,323 A * | 6/1995 | Banerjee et al. | 501/100 |
| 5,494,267 A | 2/1996 | Anderson et al. | |
| 6,008,152 A * | 12/1999 | Guillo et al. | 501/54 |
| 6,063,314 A | 5/2000 | Chadwick | |
| 6,180,034 B1 * | 1/2001 | Buck et al. | 264/39 |
| 6,245,424 B1 | 6/2001 | Lau et al. | |
| 6,380,114 B1 | 4/2002 | Brandy | |
| 6,387,172 B1 * | 5/2002 | Yu et al. | 106/680 |
| 6,528,011 B2 | 3/2003 | Connors, Sr. et al. | |
| 6,559,082 B1 | 5/2003 | Desvignes et al. | |
| 2002/0175453 A1 | 11/2002 | Connors, Sr. et al. | |
| 2003/0190275 A1 | 10/2003 | Miyazawa et al. | |

* cited by examiner

*Primary Examiner*—Kevin P Kerns
(74) *Attorney, Agent, or Firm*—Brinks Hofer Gilson & Lione

(57) ABSTRACT

A method of casting a refractory article. The method includes providing a mold formed from a slurry composition comprising plaster and fibers and adding a refractory composition to the mold. The method also includes allowing the refractory composition to set. The refractory composition comprises colloidal silica.

21 Claims, 4 Drawing Sheets

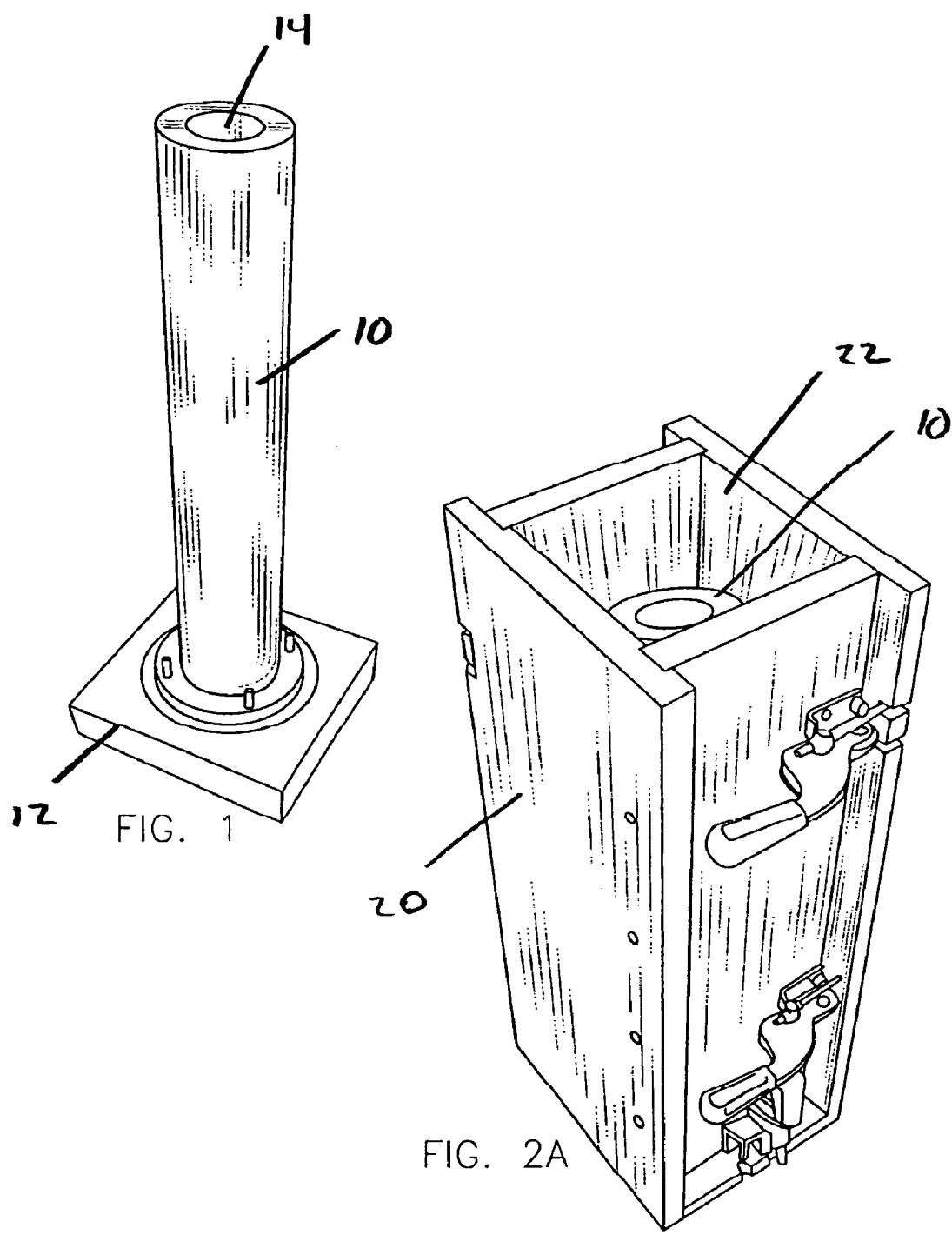

REFRACTORY CASTING METHOD

BACKGROUND

A variety of refractory articles are used in the casting of steel and other metals. These refractory articles include crucibles, kiln furniture, launder blocks, lentel blocks, nozzles, pouring cups, pouring tubes, pump tubes, shrouds, stopper rods, and tundishes. These refractory articles in the metal casting process are subjected to very harsh and corrosive working environments. They must be able to withstand hours exposed to molten metals. They must also be capable of enduring the harsh thermal shock encountered on the start-up of casting and the buoyant forces.

BRIEF SUMMARY

In one aspect, a method of casting a refractory article is provided. The method includes providing a mold formed from a slurry composition comprising plaster and fibers and adding a refractory composition to the mold. The method also includes allowing the refractory composition to set. The refractory composition comprises colloidal silica. In another aspect, the refractory composition includes about 55% to about 90% alumina, up to about 30% silicon carbide, and about 2% to about 20% silica.

According to another aspect, a method of casting a refractory article includes providing a pattern of a refractory article. A slurry composition comprising plaster is provided and disposed around the pattern. The slurry composition is allowed to set to form a mold. A refractory composition is added to the mold, and the refractory composition is heated.

The foregoing paragraphs have been provided by way of general introduction, and are not intended to limit the scope of the following claims.

BRIEF DESCRIPTION OF THE DRAWINGS

FIG. 1 is a perspective view of an embodiment of a model of a refractory article.

FIG. 2A is a side perspective view of an embodiment of a model of a refractory article in a molding box.

DETAILED DESCRIPTION

Figure 2B:
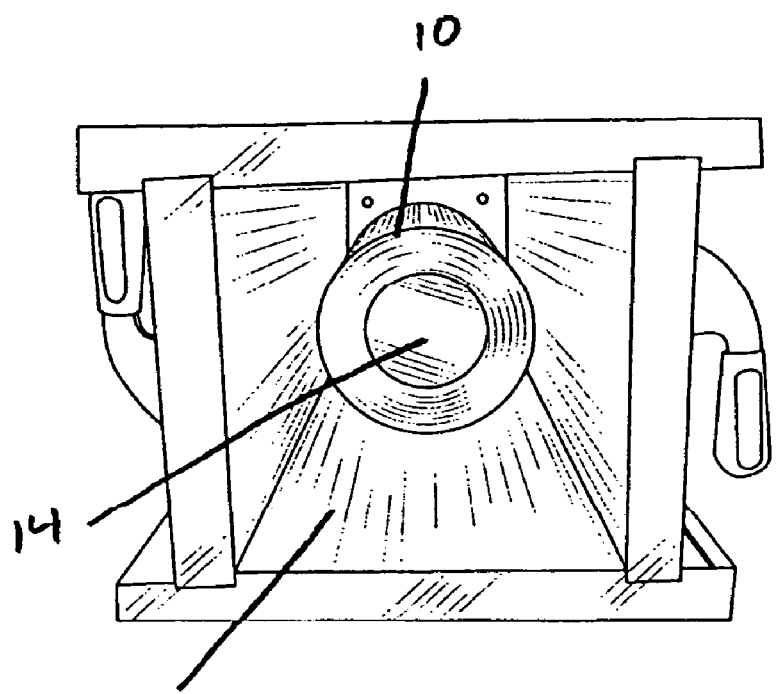
FIG. 2B is a top perspective view of an embodiment of a model of a refractory article in a molding box.

The invention is described with reference to the drawings. The relationship and functioning of the various elements of this invention are better understood by the following detailed description. However, the embodiments of this invention as described below are by way of example only, and the invention is not limited to the embodiments illustrated in the drawings.

All percentages are by solids weight unless otherwise specified.

The invention relates to a method of making refractory articles from a refractory composition using a mold. In one embodiment, the method is used to make such articles as crucibles, kiln furniture, launder blocks, lentel blocks, nozzles, pouring cups, pouring tubes, pump tubes, shrouds, stopper rods, and tundishes.

Figure 3:
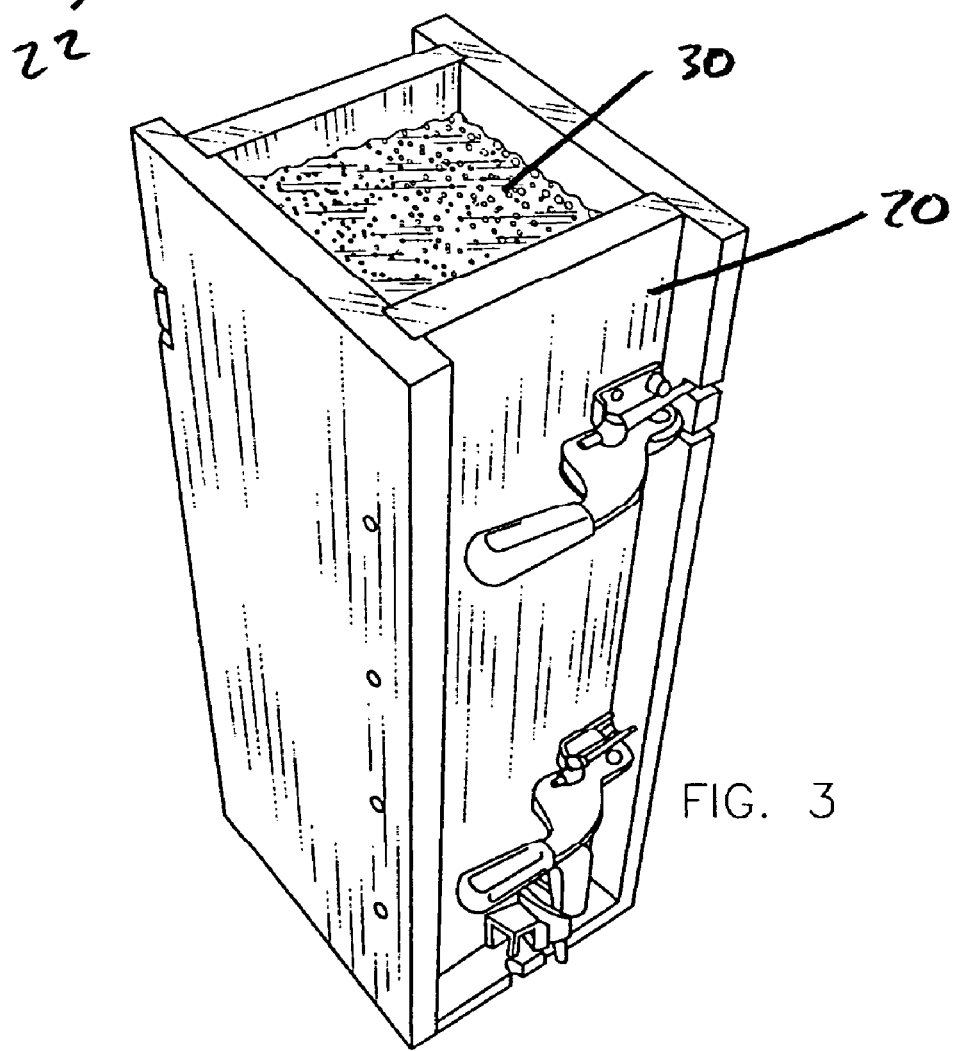
FIG. 3 shows an embodiment of a molding box filled with a slurry composition.
Figure 4:
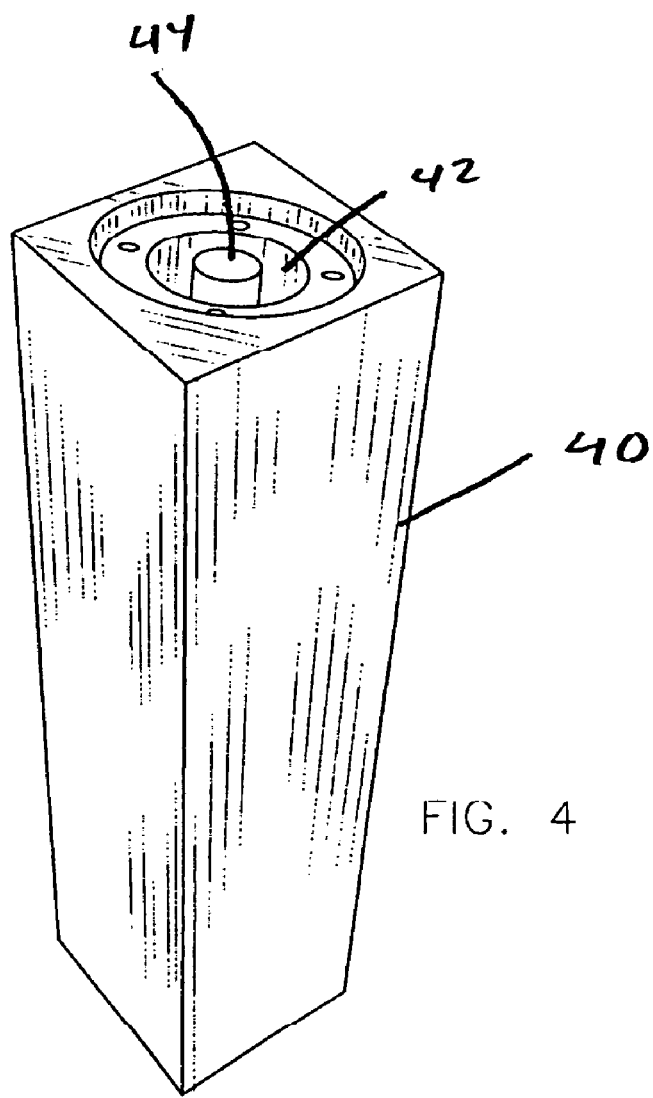
FIG. 4 shows an embodiment of a plaster mold of a refractory article.

A model or pattern of the final object to be produced is formed by any suitable method. In one embodiment, the model is made from a hard rubber, which is durable enough to allow many molds to be made. The model has a shape that corresponds to the refractory article which is to be produced. In one embodiment, the model 10 is of a generally cylindrical hollow object such as a nozzle, as shown in FIG. 1. The model 10 of the refractory article is cylindrical in shape and has a base 12 and channel 14. As shown in FIGS. 2A and 2B, the model 10 is placed in a box 20 which defines a receiving space 22 therein. A slurry composition is introduced into the receiving space 22 of the box 20 and into channel 14. The slurry may be disposed into the box by any known method, including pumping, pouring, or any other method of transporting liquid material. FIG. 3 shows the box filled with the slurry composition 30. In one embodiment, the slurry composition includes plaster. The slurry composition 30 is allowed to set to form a mold. By the term "set" is meant that the slurry composition becomes at least semi-solid. After it is set, the model is removed from the mold and the mold is removed from the box. The resulting mold 40 is shown in FIG. 4. Mold 40 has a hollow interior 42 and post 44 which corresponds to the shape of the refractory article to be produced.

The slurry composition may contain components that produce a mold with one or more of the following characteristics: low density, flexibility, and degradation when exposed to high temperatures. In one embodiment, the mold is lightweight. By lightweight, it is meant that its density is less than about 70 lb/ft$^3$. In another embodiment, the mold is compliant, meaning that it is more flexible than a mold made from ordinary plaster with no additives. In another embodiment, the mold degrades when it is exposed to high temperatures, like those in a furnace.

In one embodiment, the slurry composition includes plaster. By plaster is meant plaster of paris ($2CaSO_4.H_2O$). In one embodiment, the plaster is pottery plaster. In another embodiment, the slurry composition includes plaster and fibers. In one embodiment, the fibers are cellulosic fibers. In one embodiment, the fibers are paper fibers. Other fibers may be used, including polypropylene fiber such as Herculon™, available from Hercules Inc. In one embodiment, the paper fiber is recycled newspaper. The paper to plaster ratio may range from about 1:1 to about 1:4. In one embodiment, the paper to plaster ratio is 1:1. In other embodiments, the paper to plaster ratio is 1:2 and 1:3. The plaster mixture takes about 20 to 40 minutes to set. Additives such as citric acid and oxalic acid may be added to the slurry composition to control the set time of the plaster. The plaster mold may be allowed to fully set for 1 to 5 days before adding refractory composition to the mold.

The plaster and paper fiber mixture is less dense than pure plaster, which generally has a density of around 70 lb/ft$^3$. In one embodiment, the mold has a density of less than about 60 lb/ft$^3$. In another embodiment, the mold has a density of less than about 50 lb/ft$^3$. In another embodiment, the mold has a density of less than about 40 lb/ft$^3$. In another embodiment, the mold has a density of about 50 lb/ft$^3$.

If the refractory composition shrinks during setting, the mold made from the plaster and paper fiber mixture has the property of having "give" or flexibility so that it can accommodate this shrinkage. Plaster without any additives has limited give or compliance, and if the refractory composition shrinks during setting, cracking or other undesirable effects may occur.

In another embodiment, the slurry composition includes a combustible material. When the mold is exposed to high temperatures, the combustible material burns and causes the mold to lose its strength. In one embodiment, the combustible material is paper fiber. In another embodiment, the combustible material is cotton flock powder. The combustible material may include other organic components. Other additives may be added to the slurry composition to improve its properties.

After the slurry composition is set to form a mold, the mold is then filled with a refractory composition. The refractory composition may be transported by any known method, including pumping, pouring, or any other method of transporting liquid material. The refractory composition is allowed to set in the mold. Vibration may be used to help the refractory composition to completely fill the mold and remove air bubbles. In one embodiment, the refractory composition shrinks during setting and the mold is sufficiently flexible or compliant to accommodate this shrinkage.

The method may be used to produce a refractory article with or without a hollow channel. As shown in FIG. 1, in one embodiment, the model 10 of the refractory article has a hollow channel 14 running in the longitudinal direction of the model 10. The model 10 is used to cast a corresponding mold 40 that has a longitudinal post 44 through the center of the mold 40. In another embodiment, a mold is prepared from a solid model, and a longitudinal rod is inserted into the mold. The longitudinal rod for the mold may be made from any suitable material, such as a plaster composition or a synthetic material such as vinyl or rubber. The mold is then filled with a refractory composition to cast a refractory article with a center channel.

Although the Figures illustrate the casting of a generally cylindrical refractory article, it will apparent to those skilled in the art that the method may also be used to cast a variety of other shapes. Other shapes may include various other items for metal casting operations, including crucibles, kiln furniture, launder blocks, lentel blocks, nozzles, pouring cups, pouring tubes, pump tubes, shrouds, stopper rods, and tundishes.

Figure 5:
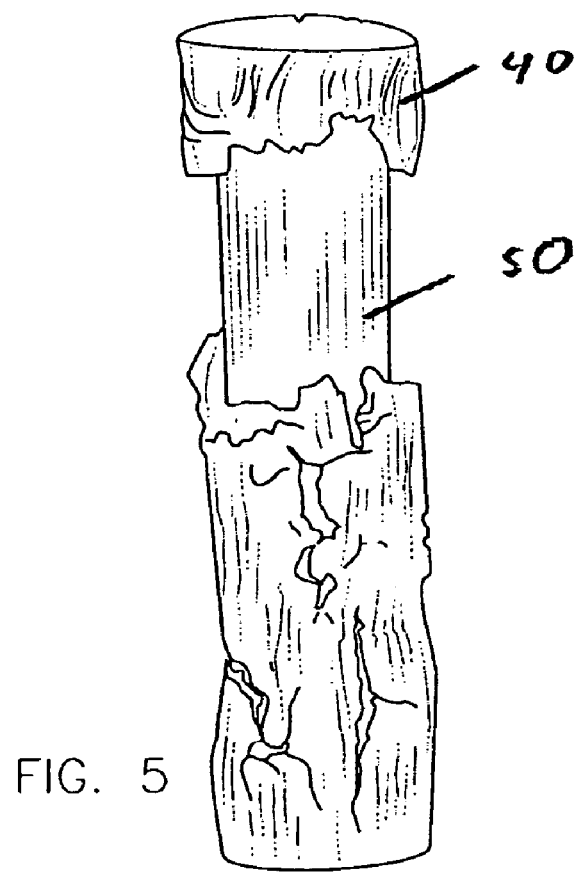
FIG. 5 shows an embodiment of a refractory article partially covered by a degraded mold.

In one embodiment, after the mold cavity is filled with the refractory composition, the mold and refractory are heated. In one embodiment, the mold and refractory composition are heated to a temperature of at least about 800° F. In another embodiment, the mold and refractory composition are heated to a temperature of at least about 1000° F. In another embodiment, the mold and refractory composition are heated to a temperature of at least about 1200° F. In one embodiment, the mold and refractory composition are kept at the elevated temperature for about 8 to 10 hours. In one embodiment, the mold and the refractory composition are heated in a furnace. The high temperature dries and sets the refractory. In one embodiment, the high temperature also weakens the strength of the mold, allowing it to easily be removed from the refractory product. In one embodiment, the heat burns the paper fiber and weakens the plaster mold, causing the mold to fall apart. FIG. 5 shows one embodiment of the refractory article 50 and the weakened mold 40 after they are removed from the furnace.

Figure 6:
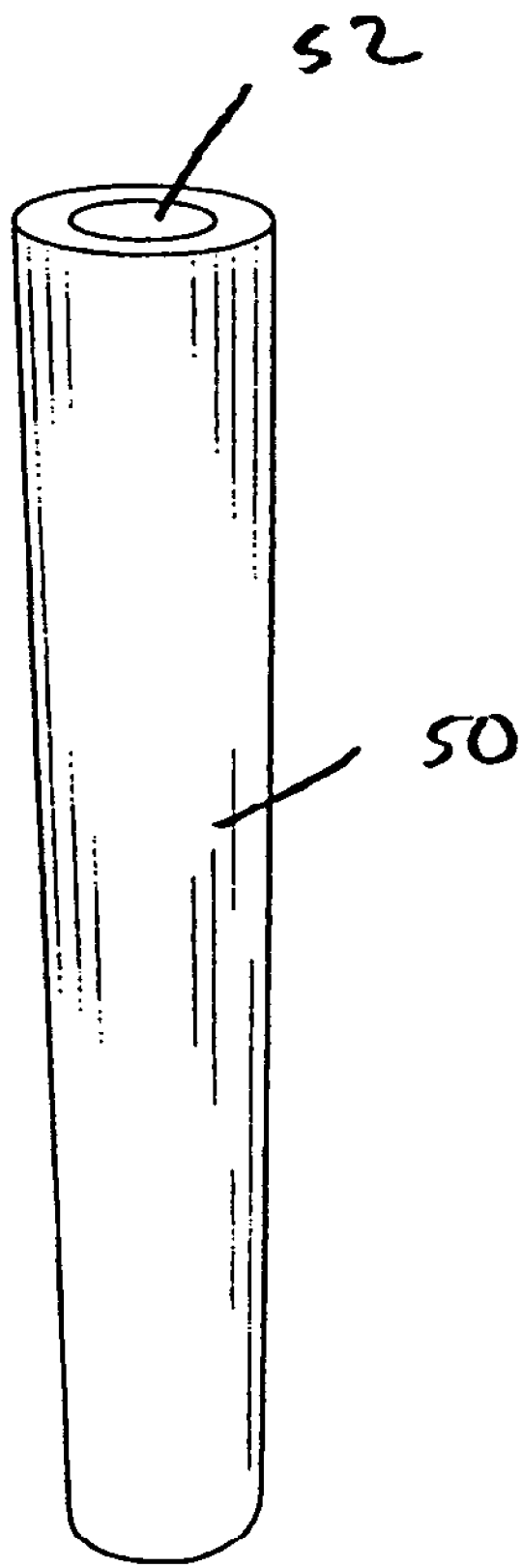
FIG. 6 shows an embodiment of a refractory article.

After the refractory article is removed from the furnace, it is allowed to cool to a safe handling temperature. The mold 40 is removed from the refractory article, and portions of the mold 40 may be recycled for the slurry to make new molds. The refractory article may be machined to achieve the desired dimensions of the final product. FIG. 6 shows an embodiment of the final refractory article 50 with channel 52 after machining.

The refractory composition can include any suitable refractory material. In one embodiment, the refractory composition is a colloidal silica refractory composition. Exemplary colloidal silica refractory compositions are disclosed in U.S. Pat. No. 5,147,830 entitled "Composition and method for manufacturing steel-containment equipment," U.S. Pat. No. 5,147,834 entitled "Gunning composition," U.S. Pat. No. 5,422,323 entitled "Nonhazardous pumpable refractory insulating composition," U.S. Pat. No. 5,494,267 entitled "Pumpable casting composition and method of use," and U.S. Pat. No. 6,528,011 entitled "Colloidal silica refractory system for an electric arc furnace," all of which are assigned to the present applicants. The refractory compositions disclosed in these patents are hereby incorporated by reference.

In one embodiment, the refractory composition comprises alumina ($Al_2O_3$), silicon carbide (SiC), and silica ($SiO_2$). In one embodiment, the refractory composition includes at least about 55% alumina by solids weight. In another embodiment, the refractory composition includes at least about 70% alumina by solids weight. In another embodiment, the refractory composition includes about 55% to about 90% alumina by solids weight. In another embodiment, the refractory composition includes about 70% to about 80% alumina by solids weight. In another embodiment, the refractory composition includes about 73% alumina by solids weight.

In one embodiment, the alumina is selected from at least one of brown fused alumina, white fused alumina, tabular alumina, reactive alumina, calcined alumina, and aluminosilicate such as mullite or bauxite type material. In one embodiment, the alumina has an average particle diameter in the range of about 30 micrometers through about 7 millimeters.

In one embodiment, the refractory composition includes about 2% to about 30% SiC by solids weight. In another embodiment, the refractory composition includes at least about 2% SiC by solids weight. In another embodiment, the refractory composition includes up to about 30% SiC by solids weight. In another embodiment, the refractory composition includes up to about 20% SiC by solids weight. In another embodiment, the refractory composition includes about 10% to about 20% SiC by solids weight. In another embodiment, the refractory composition includes about 17% SiC by solids weight. In one embodiment, the silicon carbide has an average particle diameter in the range of about 30 micrometers through about 3.5 millimeters.

In one embodiment, the refractory composition includes at least about 2% silica by solids weight. In another embodiment, the refractory composition includes about 2% to about 20% silica by solids weight. In another embodiment, the refractory composition includes about 5% to about 10% silica by solids weight. In another embodiment, the refractory composition includes about 6.5% silica by solids weight.

In one embodiment, the refractory composition includes an aqueous colloidal silica binder. The refractory composition may include an alumino-silicate type material or a fumed silica material in addition to the aqueous colloidal silica binder. In one embodiment, alumino-silicate material provides up to about 15% of the silica. In another embodiment, fumed silica material provides up to 10% of the silica. The colloidal silica permits the refractory composition to be easily transported from a source to a destination using a pump or another suitable means. After the refractory sets, the colloidal silica acts as a binder.

The aqueous colloidal silica binder comprises colloidal silica in water, where the colloidal silica may be in the range of about 15% through about 70% by weight of the aqueous colloidal silica binder. In one embodiment, the colloidal silica is in the range of about 30% through about 50% by weight of the aqueous colloidal silica binder. In another embodiment, the colloidal silica is about 40% by weight of the aqueous colloidal silica binder. The colloidal silica may have an average particle diameter in the range of about 4 millimicrons through about 100 millimicrons. In one embodiment, the colloidal silica has an average particle diameter in the range of about 6 millimicrons through about 50 millimicrons. In another embodiment, the colloidal silica has an average particle diameter in the range of about 8 millimicrons through about 20 millimicrons.

In one embodiment, the refractory composition includes up to about 10% by solids weight free carbon. In one embodiment, the free carbon has an average particle diameter of about 40 microns to about 0.5 mm. In one embodiment, the refractory composition includes about 1% to about 5% by solids weight free carbon, and in another embodiment, the refractory composition includes less than about 2% by solids weight free carbon. In another embodiment, the refractory composition includes less than about 1% by solids weight free carbon. In one embodiment, the carbon is in the form of petroleum pitch, which is a mixture of carbon and volatile organic compounds. In another embodiment, the carbon is in the form of graphite.

The refractory composition may have other components, especially those associated with the manufacture of refractory compositions.

The components of the refractory composition may be mixed together prior to mixing with the colloidal silica binder. The components of the refractory composition may also be wet or dry prior to mixing with the colloidal silica binder.

EXAMPLES

Various refractory articles were prepared according to a method of the present invention. A hard rubber model of the refractory article was placed in a molding box. A slurry composition was prepared with one part recycled paper fiber per two parts plaster. The slurry composition was introduced into the molding box. The slurry composition was allowed to set. After it set, the model was removed from the mold and the mold was removed from the molding box. The mold was allowed to fully set for 1 to 5 days before the refractory composition was added to the mold.

Various refractory compositions were used to make refractory articles. The refractory compositions including about 55% to about 90% alumina, up to about 30% silicon carbide, and about 2% to about 20% silica mixed with 8-10% silica binder. The mold was filled with one of the refractory compositions. The refractory composition was allowed to set in the mold. The refractory composition shrank somewhat during setting and the mold had sufficient flexibility to accommodate this shrinkage. The mold and the refractory composition were heated in a furnace at about 1200° F. for about 8 hours. The high temperature weakened the mold, allowing it to easily be removed from the refractory product. After the refractory article was removed from the furnace, it was allowed to cool to a safe handling temperature. If necessary, the refractory article was then machined to the appropriate dimensions. The final refractory articles produced by the described method had the range of mechanical properties shown in Table 1, which were acceptable for their intended uses.

TABLE 1

| Density (lbs./cu.ft.) | 176-184 |
|---|---|
| Porosity (%) | 15-18 |
| Cold MOR (psi) | 900-1300 |
| Cold Crushing Strength (psi) | 4000-8000 |

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

The invention claimed is:

1. A method of casting a refractory article comprising:
   providing a pattern of a generally cylindrical refractory article;
   providing a slurry composition comprising plaster and at least 20% fibers by weight;
   disposing the slurry composition around the pattern;
   allowing the slurry composition to set to form a compliant mold;
   removing the pattern from the mold;
   adding a refractory composition comprising colloidal silica to the mold; and
   heating the refractory composition to form the refractory article.

2. The method of claim 1 wherein the mold and refractory composition are heated at a temperature of at least about 1000° F.

3. The method of claim 1 wherein the refractory composition comprises
   about 55% to about 90% alumina by weight,
   up to about 30% silicon carbide by weight, and
   about 2% to about 20% silica.

4. The method of claim 1 wherein the fibers are paper fibers.

5. The method of claim 4 wherein the slurry composition comprises at least about 25% paper fiber by weight.

6. The method of claim 4 wherein the slurry composition comprises at least about 33% paper fiber by weight.

7. The method of claim 1 wherein the refractory article is selected from nozzles, pouring tubes, pump tubes, shrouds, and stopper rods.

8. The method of claim 1 wherein the density of the mold is between about 50 lb/ft$^3$ and about 70 lb/ft$^3$.

9. A method of claim 1 wherein the mold degrades upon heating.

10. The method of casting a refractory article comprising:
    providing a pattern of a stopper rod;
    providing a slurry composition comprising plaster;
    disposing the slurry composition around the pattern;
    allowing the slurry composition to set to form a compliant mold;
    removing the pattern from the mold;
    adding a refractory composition comprising colloidal silica to the mold; and
    heating the refractory composition to form a stopper rod, wherein the mold degrades upon heating.

11. The method of claim 10 wherein the refractory composition comprises about 55% to about 90% alumina by weight,
    up to about 30% silicon carbide by weight, and
    about 2% to about 20% silica.

12. The method of claim 10 wherein the slurry composition comprises at least 20% paper fiber by weight.

13. The method of claim 10 wherein the slurry composition comprises at least about 25% paper fiber by weight.

14. The method of claim 10 wherein the slurry composition comprises at least about 33% paper fiber by weight.

15. The method of claim 10 wherein the stopper rod has a cold modulus of rupture of at least 900 psi.

16. The method of claim 10 wherein the stopper rod has a cold crushing strength of at least 4000 psi.

17. A method of casting a refractory article comprising:
    providing a pattern of a stopper rod;
    providing a slurry composition comprising plaster and at least 20% fibers by weight;
    disposing the slurry composition around the pattern;
    allowing the slurry composition to set to form a compliant mold with a density of between about 50 lb/ft$^3$ and about 70 lb/ft$^3$;
    removing the pattern from the mold;
    adding a refractory composition comprising colloidal silica to the mold;
    heating the refractory composition to form a stopper rod, wherein the mold degrades upon heating;
    and removing the stopper rod from the degraded mold.

18. The method of claim 17 wherein the slurry composition comprises at least about 25% paper fiber by weight.

19. The method of claim 17 wherein the slurry composition comprises at least about 33% paper fiber by weight.

20. The method of claim 17 wherein the stopper rod has a cold modulus of rupture of at least 900 psi.

21. The method of claim 17 wherein the stopper rod has a cold crushing strength of at least 4000 psi.

\* \* \* \* \*